(12) United States Patent
Frank

(10) Patent No.: US 8,152,298 B2
(45) Date of Patent: Apr. 10, 2012

(54) EYEGLASS SUPPORT

(76) Inventor: James Frederick Frank, San Diego, CA (US)

( * ) Notice: Subject to any disclaimer, the term of this patent is extended or adjusted under 35 U.S.C. 154(b) by 266 days.

(21) Appl. No.: 12/640,349

(22) Filed: Dec. 17, 2009

(65) Prior Publication Data

US 2010/0157238 A1 Jun. 24, 2010

Related U.S. Application Data

(60) Provisional application No. 61/139,458, filed on Dec. 19, 2008.

(51) Int. Cl.
*G02C 3/00* (2006.01)

(52) U.S. Cl. ............... 351/156; 351/158; 2/452

(58) Field of Classification Search ............... 351/156, 351/155, 158, 41; 2/10, 452; 24/3.3
See application file for complete search history.

(56) References Cited

U.S. PATENT DOCUMENTS

| | | | | |
|---|---|---|---|---|
| 104,216 A | * | 6/1870 | Sickels | ............... 351/156 |
| 3,531,187 A | * | 9/1970 | Brown | ............... 351/227 |
| 3,832,043 A | | 8/1974 | Usdan | |
| 3,955,885 A | | 5/1976 | Aronsohn | |
| 4,129,362 A | | 12/1978 | Lorenzo | |
| 4,885,808 A | * | 12/1989 | Carpenter | ............... 2/452 |
| 5,521,653 A | * | 5/1996 | Anderson | ............... 351/45 |
| 6,986,577 B1 | | 1/2006 | Jamie et al. | |
| 7,478,906 B2 | * | 1/2009 | Fielding, Jr. | ............... 351/156 |
| 2003/0160939 A1 | | 8/2003 | Webber | |
| 2006/0077339 A1 | | 4/2006 | Jamie et al. | |
| 2006/0082723 A1 | | 4/2006 | Jamie et al. | |
| 2006/0098160 A1 | | 5/2006 | Jamie et al. | |

* cited by examiner

*Primary Examiner* — Hung Dang
(74) *Attorney, Agent, or Firm* — Berenato & White, LLC

(57) ABSTRACT

A device for enhancing support of eyeglasses on the head of a person. The device is in the form of an independent support member or an adjustable strap having a support member to enhance support of eyeglasses. The strap may include a cushion to provide comfort. The support member includes a hook for supporting the eyeglasses. The device is useful for supporting eyeglasses from the bridge of the nose of a person who has undergone rhinoplasty surgery or for supporting heavy equipment associated with eyeglasses used for surgical applications. The independent support member is easily attached to a head-engaging device and eyeglasses to enhance support of the eyeglasses.

17 Claims, 7 Drawing Sheets

EYEGLASS SUPPORT

RELATED APPLICATIONS

This application claims the benefit of U.S. Provisional Application Ser. No. 61/139,458, filed Dec. 19, 2008.

FIELD OF THE INVENTION

The present invention generally relates to an appliance including a support member for supporting eyeglasses on the head of a user. The appliance is adjustable to different heads sizes and includes a support member to support eyeglasses off the nose of a person having undergone rhinoplasty surgery. The appliance may also be used with relatively heavy apparatus such as that used in surgical applications. Also disclosed is a support member, which may be easily and independently attachable to head-encircling devices to provide support for eyeglasses.

DESCRIPTION OF THE PRIOR ART

Various devices have been proposed to keep eyeglasses from contacting the bridge of the nose of a patient who has undergone rhinoplasty surgery. See, for example U.S. Pat. No. 3,955,885 issued to Aronsohn. This device employs support members affixed to an eyeglass frame whereby the frame is supported off the bridge of the user's nose. However, the support members can cause an obstruction to the downward field of vision, a disadvantage especially for those with bifocal lenses.

U.S. Patent Publication US 2006/0098160 A1 discloses a complicated balancing system that needs to be incorporated with the particular eyeglasses being worn. This system requires careful balancing and positioning of attachments.

U.S. Patent Application Publication US 2006/0077339 A1 and U.S. Patent Application Publication US 2006/0082723 A1 disclose devices attached directly to the eyeglasses to support the eyeglasses off the bridge of the nose. However, these devices require altering the eyeglasses, thus destroying the original style of the eyeglasses, requiring expensive replacement after the need for keeping the eyeglasses off the nose is no longer required.

SUMMARY OF THE INVENTION

The primary object of the present invention is to provide a post-surgical (rhinoplasty in particular) appliance that can aid in the healing process by holding eyeglasses spaced from the bridge of the nose of the wearer. Another object of the invention is to provide an appliance that is adjustable to different head sizes and does not require alteration of the eyeglasses or obstruct downward field of vision. A further object is to provide an appliance that is convenient, comfortable and easy to use to aid in the healing of a patient's nose. A further object of the invention is to provide an appliance that assists in holding eyeglasses used in surgical applications where attachments such as light devices or magnifiers are mounted to the glasses. Finally, an object of the invention is to provide an independent support member that may be easily attached to a head-engaging appliance to support eyeglasses.

The above objects are achieved by the present invention, which utilizes a head-encircling strap attached to a support member that holds glasses spaced from the bridge of the nose of the wearer. The support member optionally has a padding of sufficient thickness to provide comfort to the user and space the glasses a few millimeters away from the user's nose. The strap is adjustable in length and is attached to the support member. The free ends of the support member may be bent back to form loops to aid in the attachment and removal of the head-encircling strap. The support member may also be provided with integral connecting portions to attach to the strap.

In one embodiment, an additional strap is attached to the support member and head-encircling strap and engages the top of the head.

In another embodiment, the head-engaging strap is adjustable by a pawl engagable with a selected hole in the strap and a sheath is provided that partially encloses the support member and strap.

In another embodiment, an independent support member is provided which can be easily attached to a head-encircling strap, which supports vision-enhancing surgical devices.

In a typical embodiment of the present invention, the appliance is made up of the following elements: (1) an adjustable band which encircles the head of a user, (2) a support member attached to the strap at each end and including a curved hook to support the glasses thereon and (3) a pad attached to the support member to cushion the support member against the head and to act as a spacer to hold the eyeglasses away from the nose.

Further, this invention can also have one or more of the following: (1) an additional strap attached to the support member and to the head encircling strap to engage the top of the head, (2) a pivoting pawl engageable with a selected hole in the strap to enable the strap the be adjustable in length and a sheath at least partially enclosing the support member and strap and (3) an independent support member which may be easily attached to a head-engaging apparatus and eyeglasses.

BRIEF DESCRIPTION OF THE DRAWINGS

FIG. 12 is a perspective view of the pawl assembly of the embodiment of FIG. 11.

DETAILED DESCRIPTION

Figure 1:
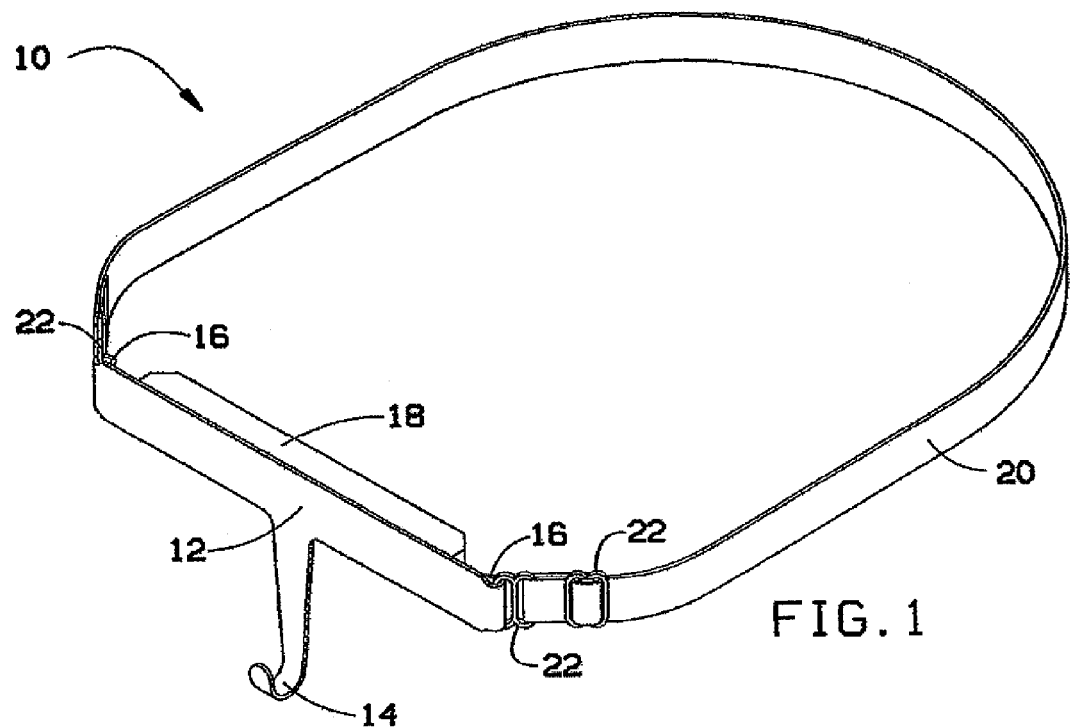
FIG. 1 is a perspective view of a post-surgical appliance according to one embodiment of the present invention.

With reference to the drawing Figures: The device 10, generally shown in FIG. 1, comprises a head encircling strap 20 and a generally T-shaped support member 12.

Strap 20 in the embodiment of FIG. 1 is preferably of well-known material such as elastic fabric used in the manufacture of women's bra straps. However, the strap may be made from any material suitable for this purpose.

Support member 12 is preferably made from plastic, although other lightweight materials such as metal may be used. Support member 12 includes a curved hook member 14, although any shape that provides support may be employed, depending on the shape of the apparatus to be supported. Hook member 14 serves as a support for eyeglasses or other devices intended to be supported on the head of a user. For example, if eyeglasses are to be supported, the bridge of the glasses would be placed on the hook member.

The free ends of the horizontal portion of support member 12 are bent back to form loops 16 to provide eyelets that secure a portion of connector 22 therein. In the embodiment shown in FIGS. 1-4, connectors 22 are in the form of two closed loops.

Figure 2:
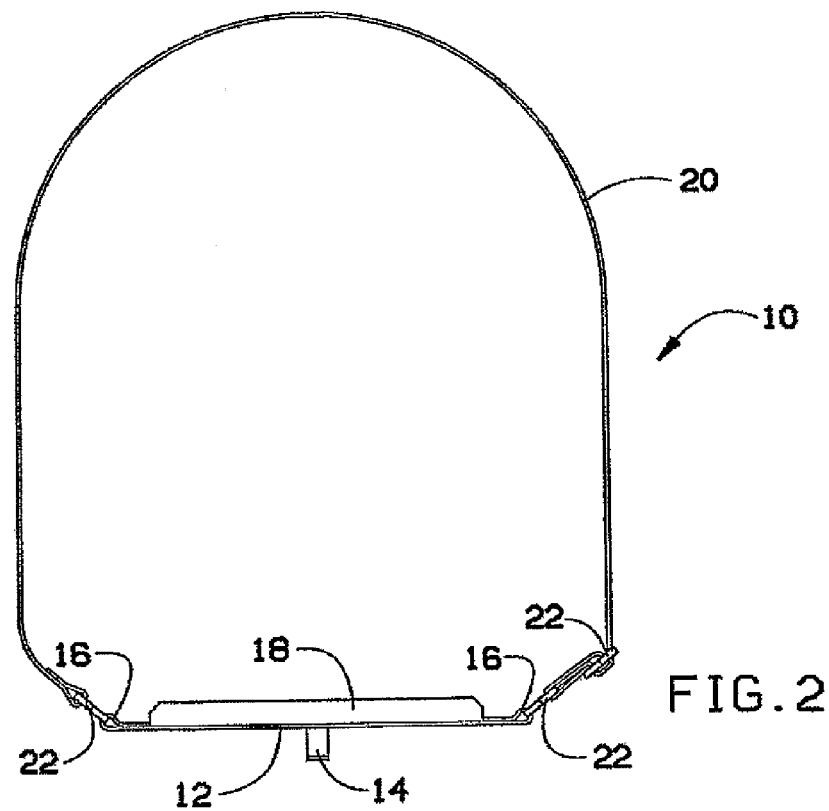
FIG. 2 is a top plan view of the invention shown in FIG. 1.
Figure 3:
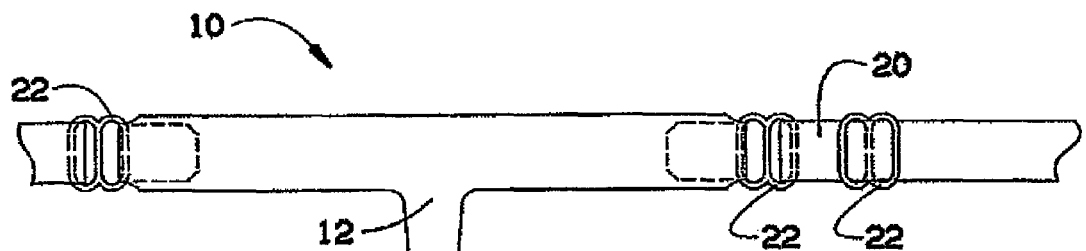
FIG. 3 is a partial front view of the invention shown in FIG. 1.
Figure 4:
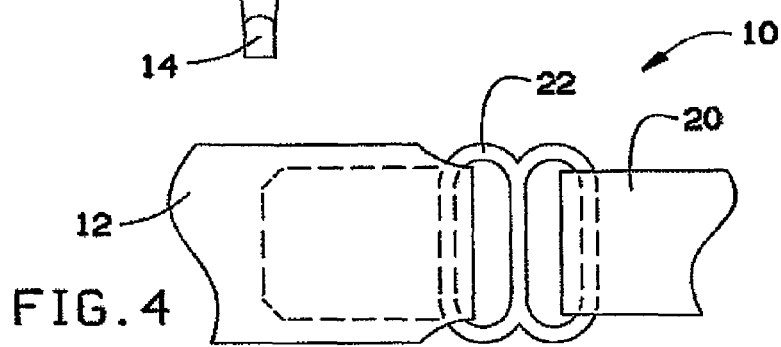
FIG. 4 is a side view of a connector used to secure the strap to the support member.

FIGS. 1 and 2 further show a cushion 18 attached to support member 12. The cushion may be in the form of a foam or fabric pad to provide comfort to the forehead of a patient and to space the support and hook member a few millimeters away from the bridge of the nose when the device is placed on the head of the patient. Each end of strap 20 is secured to loops 16 by passing around connectors 22 as seen in FIGS. 1-4. One or both ends of the strap may be made adjustable by threading the strap through an additional connector 22 in a known manner.

Figure 8:
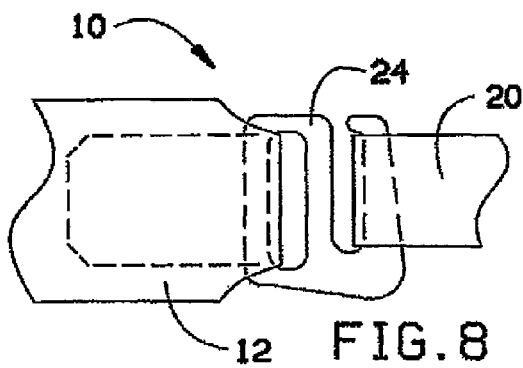
FIG. 8 is a side view of a connector used to secure the strap to the support member according to another embodiment of the invention.
Figure 9:
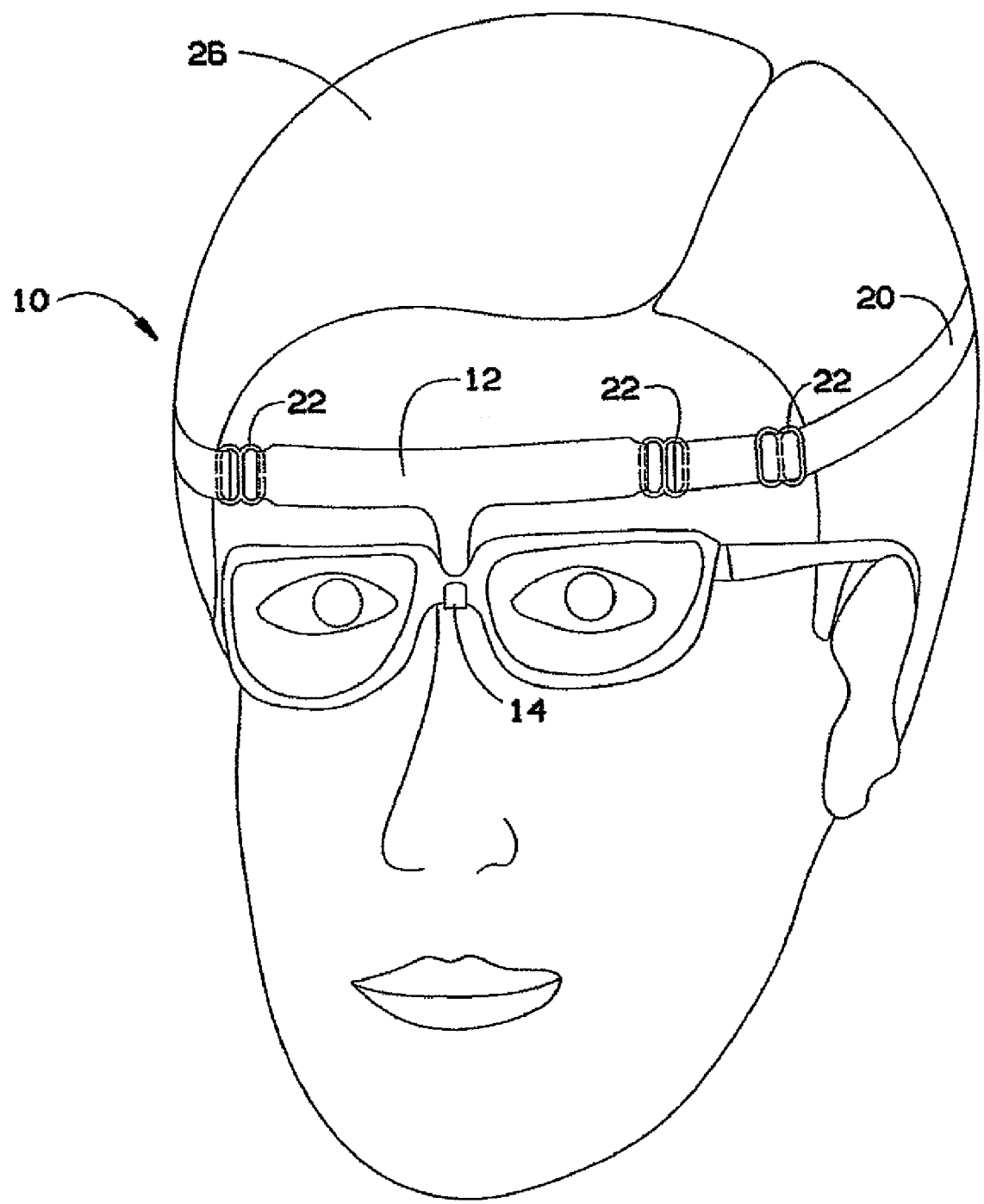
FIG. 9 is a perspective view of the post-surgical appliance according to the present invention as it is applied to the head of a patient.

FIG. 8 shows an alternative embodiment wherein the strap 20 is secured to support member 12 by connector 24. Connector 24 differs from connector 22 in that one of the loop portions is not closed. Such an open configuration facilitates easy and quick attachment and removal of the strap 20.

Figure 5:
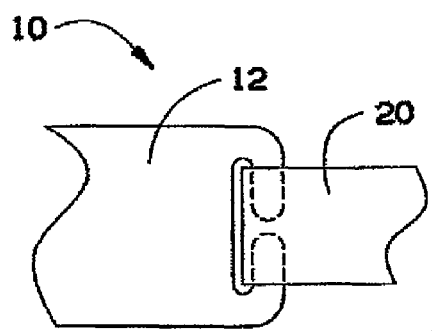
FIG. 5 is a side view of a connecting portion of the support member according to another embodiment of the invention.
Figure 6:
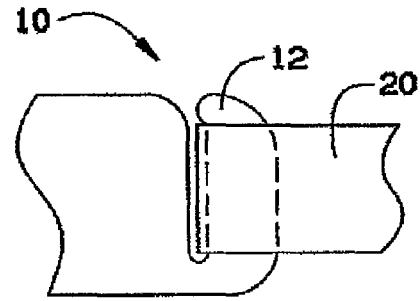
FIG. 6 is a side view of a connecting portion of the support member according to another embodiment of the invention.
Figure 7:
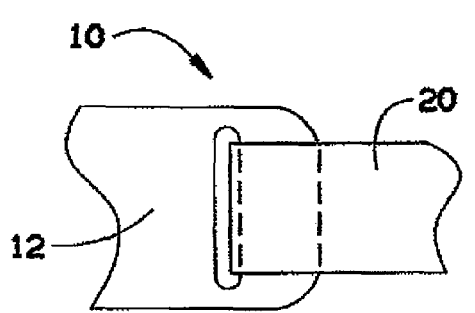
FIG. 7 is a side view of a connecting portion of the support member according to another embodiment of the invention.

FIGS. 5-7 show other embodiments wherein the free end(s) of support 12 are formed with connector portions that are formed integrally with the support member. These integral connector portions negate the need for separate connectors to attach the strap 20 to the support 12.

In the embodiment of FIG. 5, the connector portion of the support member 12 terminates in two facing projections spaced from each other to provide for easy connection to strap 20.

In the embodiment of FIG. 6, the connector portion of the support member is formed as an integral hook for easy connection of strap 20.

In the embodiment of FIG. 7, the connector portion of the support member 12 forms a closed loop.

Figure 10:
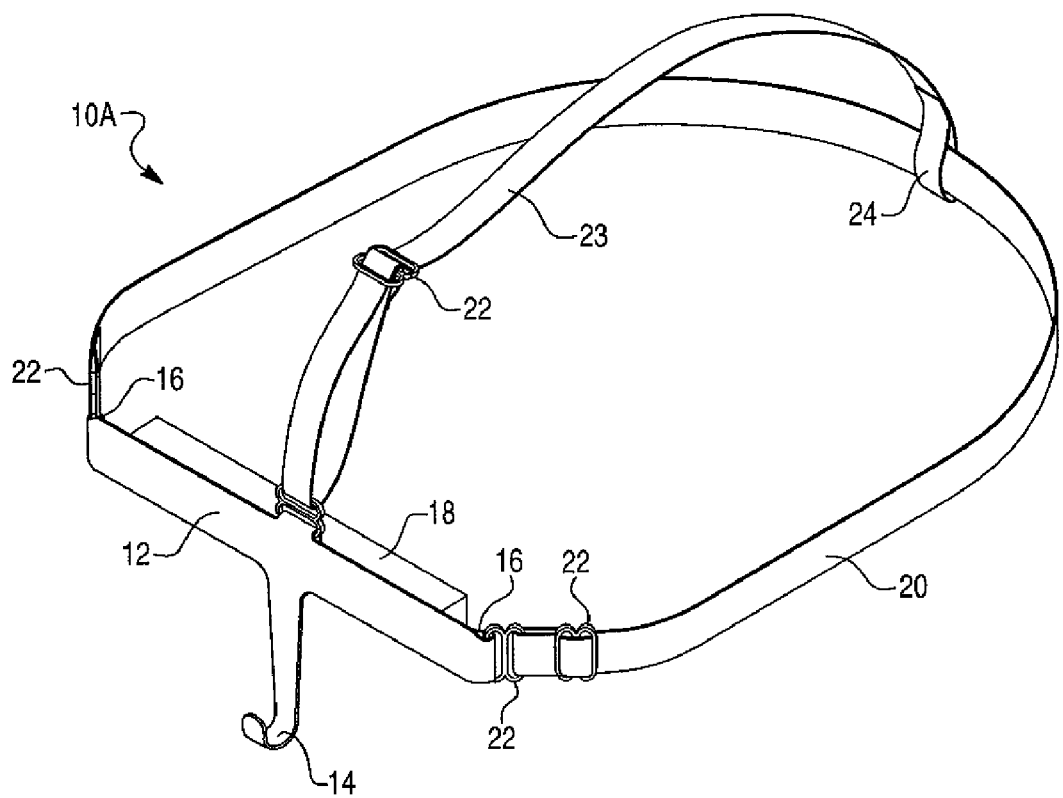
FIG. 10 is a perspective view similar to FIG. 1 wherein a head-engaging strap is provided according to a further embodiment of the invention.

FIG. 10 illustrates an embodiment of the device 10A wherein a head-engaging strap 23 is attached to the support member 12 at one end and is provided with a loop 24 at the other end. Loop 24 allows for sliding movement of the strap 23 along strap 20. Strap 23 engages the top of the patient's head when the device is worn. An additional connector 22 may be provided on strap 23 to adjust the length of the strap in the same manner as connector 22 on strap 20.

Figure 11:
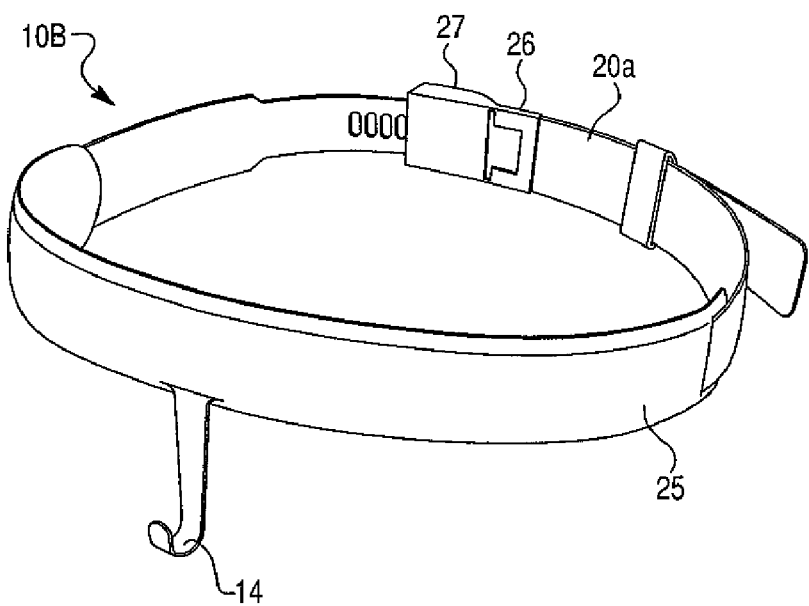
FIG. 11 is a perspective view of the appliance according to yet another embodiment of the present invention.
Figure 12A:
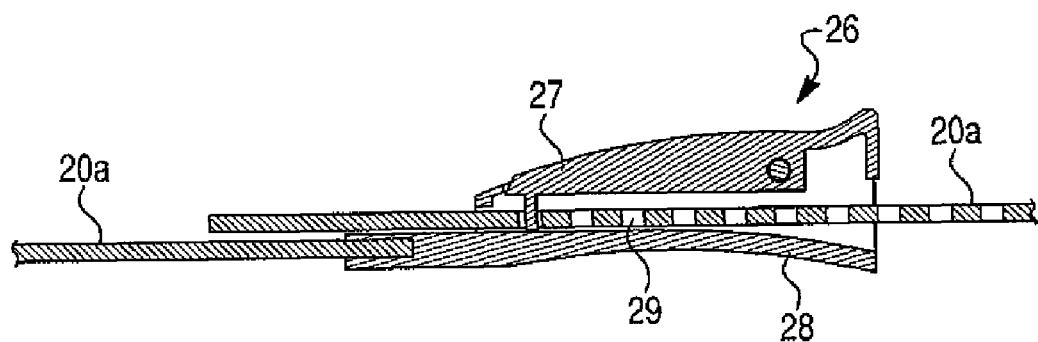
FIG. 12A is a sectional view of the pawl mechanism used in FIG. 11 in a latched position.
Figure 12B:
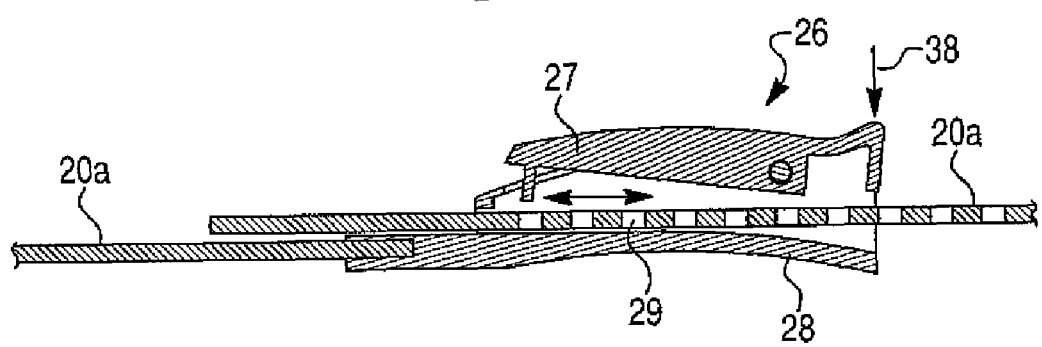
FIG. 12B is a sectional view of the pawl mechanism of FIG. 12A in an unlatched condition.
Figure 13:
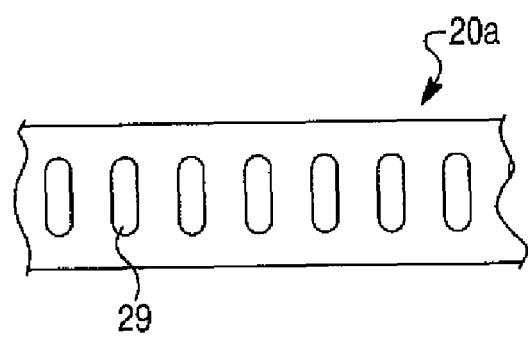
FIG. 13 is a side view of the strap used in the embodiment of FIG. 11.

FIG. 11 shows yet another embodiment of the device 10B wherein the support member and both the end portions of strap 20a that connect to the T-shaped support member are surrounded by a sheath 25. Hook member 14 of the T-shaped support member extends through an opening in sheath 25. One end of the strap 20a is provided with perforations 29 as best seen in FIG. 13 and the other end of the strap is provided with a strap engaging member 26. Strap engaging member 26 includes a pawl 27 pivotally mounted on base 28 as best seen in FIGS. 12A and 12B. The pawl 27 may be manually pivoted away from the strap 20a by application of force in the direction of arrow 38 to allow the strap 20a to slide in base 28 until the desired circumference of the strap is obtained. At that point, the pawl is released to engage in one of the holes 29 to hold the strap 20a in the desired size. Sheath 25 may be provided with padding for comfort. This embodiment is particularly useful to hold heavy eyeglasses or other sight enhancing appliances on the head of a user in such a way as to support the weight of the eyeglasses or other appliance.

Figure 14:
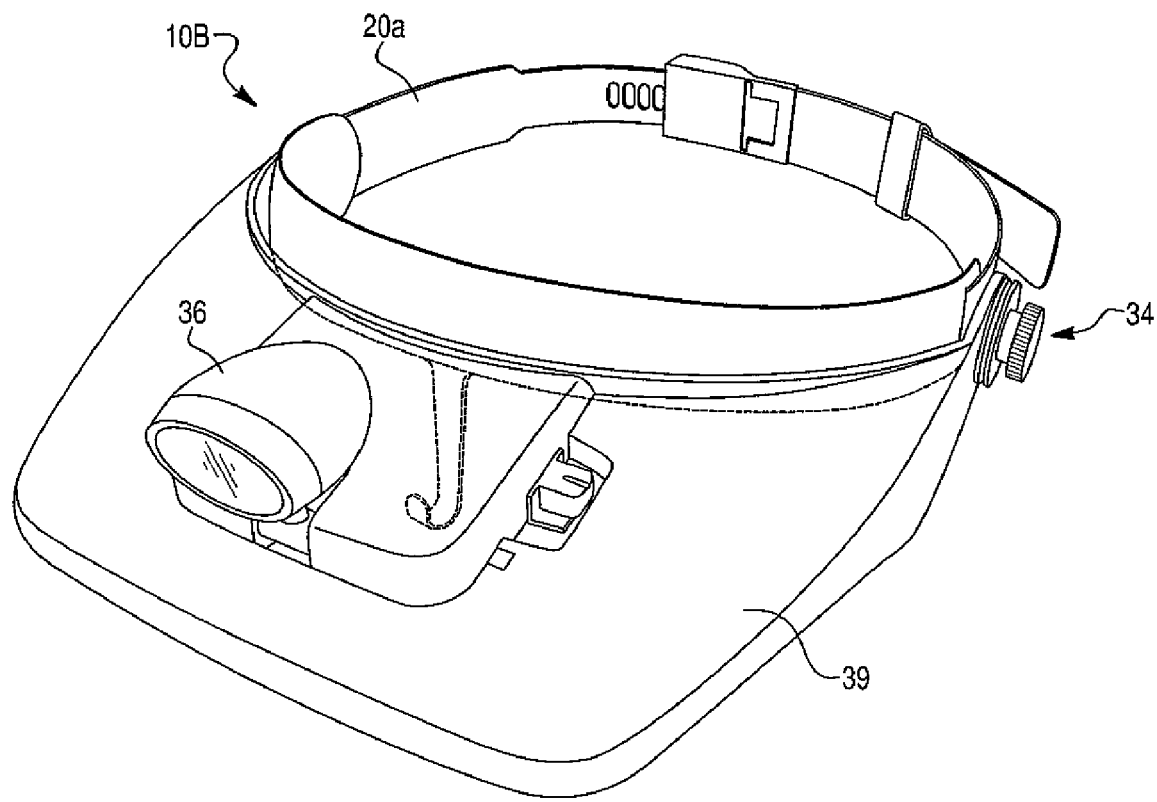
FIG. 14 is a perspective view of the appliance of FIG. 11 used with a visor having a light thereon.
Figure 15:
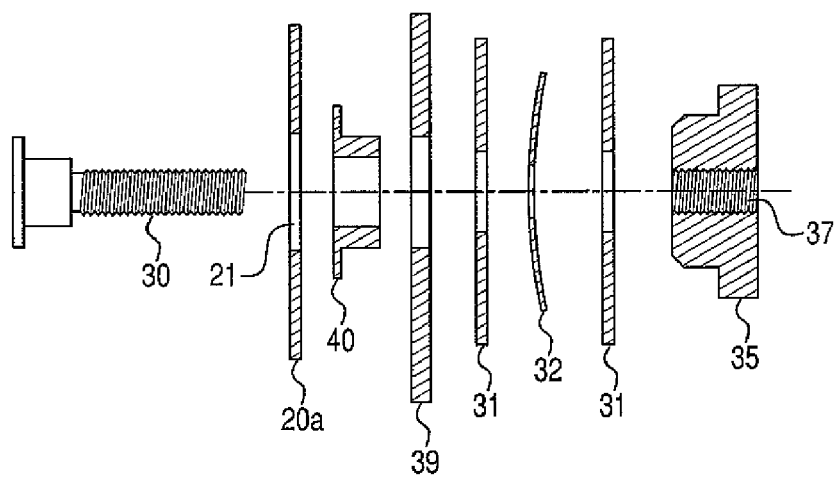
FIG. 15 is an exploded view of the hinge assembly of FIG. 14.

FIG. 14 shows an embodiment wherein the device 10B is attached to a visor 39 having a battery powered light 36 pivotally mounted thereon. This embodiment is particularly useful when extra light is required while using eyeglasses such as in the case of surgical applications. Also, as in the embodiment of FIG. 11 described above, it is useful for supporting heavier eye appliances. Visor 39 is pivotally attached to band 20b via connecting assembly 34. Band 20b is similar to band 20a of FIG. 11 except that holes 21 are provided to receive bolt 30. The connecting assembly is shown in detail in FIG. 15. Threaded bolt 30 passes through hole 21 in strap 20 then through bolt support 40, visor 39, washer 31, spring washer 32, then a second washer 31 before mating with threaded hole 37 of nut 35. A spring washer 32 is sandwiched between two flat washers. This assembly allows the visor to be pivoted and held in any position when the visor is connected to the strap 20b. In that way, the visor may be pivoted downwardly when extra light is needed or pivoted to an up position when the visor and light is not required. Strap 20a may also be provided with another hole 21 and assembly such as shown in FIG. 15 on the opposite side of the visor.

Figure 16:
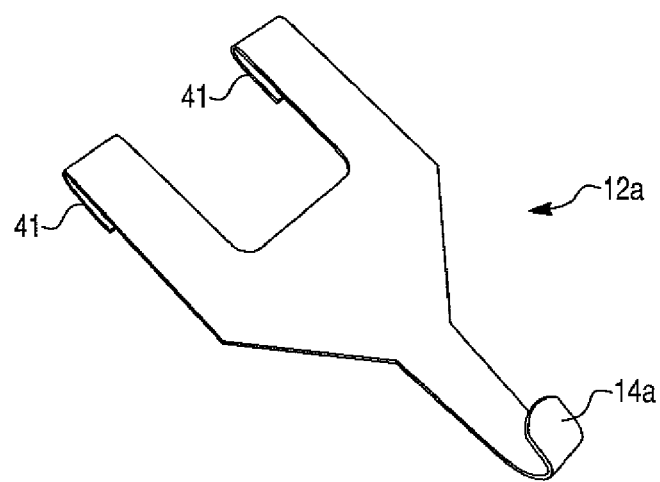
FIG. 16 is a perspective view of an alternative embodiment of the support member.
Figure 17:
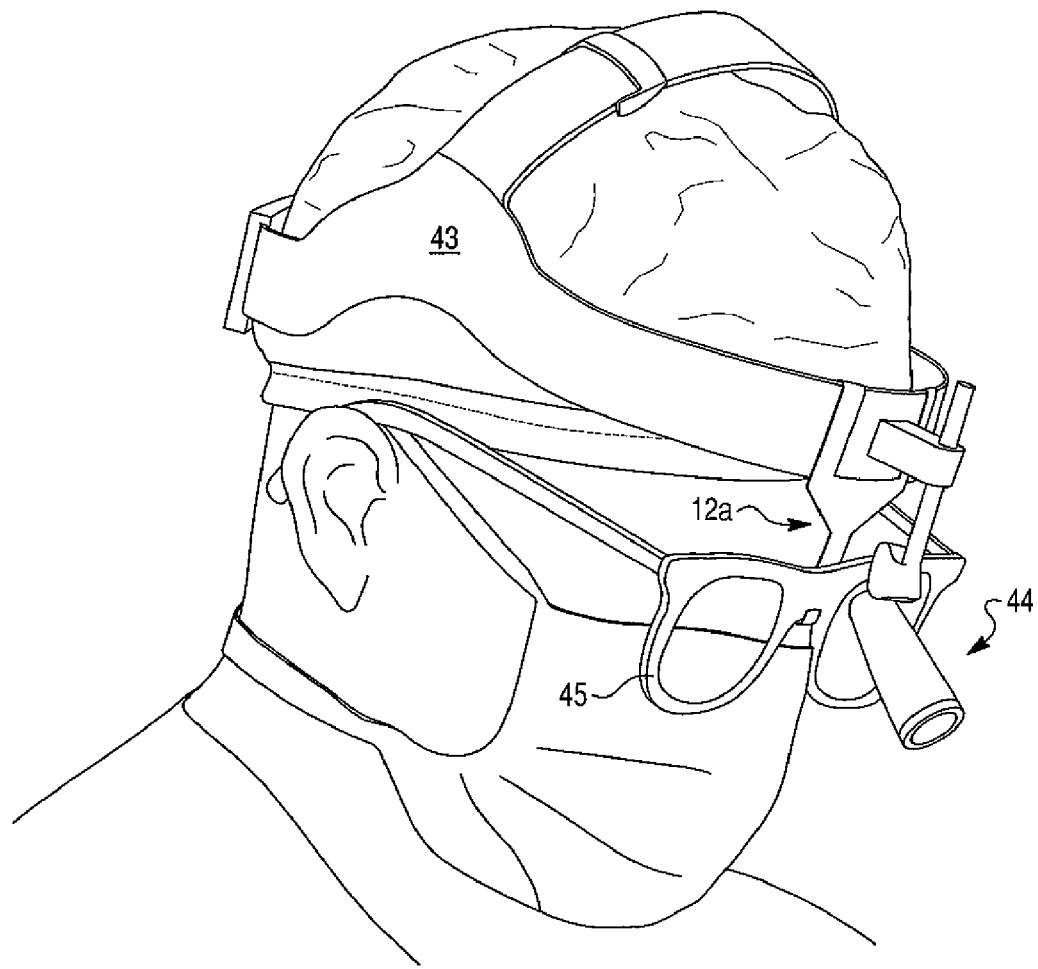
FIG. 17 is a perspective view of the support member of FIG. 16 attached to a device used in surgical applications.

FIG. 16 shows another embodiment of the support member 12a that can be used as an easily attachable and removable independent support member. Support member 12a is generally Y-shaped to include three portions having free ends. Hook member 14a similar to hook member 14 of the embodiment shown in FIG. 1 and forms one leg of the Y shape. Legs 41 are in the form of hooks and form the other two portions of the Y shape. Legs 41 are spaced from each other in a manner to provide clearance for a portion of a surgical device 44, as seen FIG. 17. In use, hooks 41 are placed over strap 43 and hook 14a supports the bridge of eyeglasses 45. Surgical device 42 includes an instrument such as a light source or magnifying device, which may be attached to eyeglasses 45. Such light source or magnifying device is relatively heavy. When support 12a is hooked onto the strap 43 and the glasses are placed on hook member 14a, the weight of the light source or magnifying device is borne by the support 12a, thus alleviating pressure on the nose of the wearer. This embodiment therefore provides an independent and easily attachable device for adding comfort to a person such as a surgeon who uses an appliance such as that shown in FIG. 17.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure and the drawings

The invention claimed is:

1. A device for enhancing support of eyeglasses on the head of a person, comprising:
   a first strap adapted to encircle the head of the person; and
   a one-piece, T-shaped support member having a horizontal portion and a vertical portion for supporting eyeglasses thereon,
   said horizontal portion comprising connector portions at opposite free ends thereof whereby said first strap may be connected to the support member, said connector portions defined by bent terminal ends of said horizontal portion that form eyelets onto the terminal ends of said support member, said eyelets connected to said first strap; and
   said support member further including a hook member engageable with the eyeglasses to enhance the support of the eyeglasses.

2. The device, as in claim 1, further comprising:
   a cushion attached to an inside surface of said support member.

3. The device, as in claim 2, wherein:
   said cushion is a foam or fabric pad of material.

4. The device, as in claim 1, wherein said first strap is a flexible and elastic.

5. The device, as in claim 1, further comprising:
   a second strap connected to said support member between said connector portions at one end and to said first strap at the other end whereby said second strap engages the top of the head when the device is applied to the head of the person.

6. The device, as in claim 5, further comprising:
   a cushion attached to an inside surface of said support member.

7. The device, as in claim 6, wherein:
   said cushion is a foam or fabric pad of material.

8. The device, as in claim 1, further comprising:
   a connector attached to said first strap and to said connector portions whereby said first strap is connected to said support member.

9. The device, as in claim 8, wherein said connector includes two closed loops.

10. The device, as in claim 8, wherein said connector includes a closed loop and an open loop.

11. The device, as in claim 1, wherein:
    said connector portions include respective connectors having a slit forming a hook shape whereby said first strap may be easily connected to said connectors by sliding over said hook shape.

12. The device, as in claim 1, further comprising a second strap connected to said support member between said connector portions at one end and to said first strap at the other end whereby said second strap engages the top of the head when the device is applied to the head of the person.

13. The device, as in claim 1, further comprising a connector attached to said first strap and to said connector portions whereby said first strap is connected to said support member.

14. A device for enhancing support of eyeglasses on the head of a person, comprising:
    a first strap adapted to encircle the head of the person; and
    a one-piece, T-shaped support member having a horizontal portion and a vertical portion for supporting eyeglasses thereon,
    said horizontal portion of said support member comprising connector portions at free ends thereof whereby said first strap may be connected to the support member; and
    said vertical portion of said support member further including a hook member at a terminal end of said vertical portion, said hook member being integrally and homogeneously formed with both said horizontal portion and said vertical portion as a one-piece body, said hook member being engageable with the eyeglasses to enhance the support of the eyeglasses and spaced away from said horizontal member a distance sufficient to engage said eyeglasses at a bridge of a nose of a user,
    wherein the horizontal portion of said support member is flexible to conform to the shape of a user's forehead.

15. The device as in claim 14, wherein said vertical portion tapers toward said hook member.

16. The device as in claim 14, wherein said vertical portion extends a vertical length that is greater than a length of said hook member.

17. The device, as in claim 14, further comprising a cushion attached to an inside surface of said support member.

* * * * *